United States Patent [19]

Hocker et al.

[11] Patent Number: 4,519,939
[45] Date of Patent: May 28, 1985

[54] PARTICULATE DOPED POLYACETYLENE

[75] Inventors: Jürgen Hocker; Hans K. Müller; Bruno Broich, all of Bergisch-Gladbach, Fed. Rep. of Germany

[73] Assignee: Bayer Aktiengesellschaft, Leverkusen, Fed. Rep. of Germany

[21] Appl. No.: 362,100

[22] Filed: Mar. 26, 1982

[30] Foreign Application Priority Data

Apr. 2, 1981 [DE] Fed. Rep. of Germany ....... 3113330

[51] Int. Cl.³ ............................................... H01B 1/06
[52] U.S. Cl. ..................................... 252/500; 252/518
[58] Field of Search ....................... 252/500, 518, 512; 526/285

[56] References Cited

U.S. PATENT DOCUMENTS 4,228,060 10/1980 Pez ....................................... 252/500
4,397,971 8/1983 Hocker et al. ....................... 525/202

FOREIGN PATENT DOCUMENTS 0045905 2/1982 European Pat. Off. .
0045908 2/1982 European Pat. Off. .
2072197 9/1981 United Kingdom .

Primary Examiner—Josephine L. Barr
Attorney, Agent, or Firm—Connolly and Hutz

[57] ABSTRACT

A process for the production of a suspension of doped polyacetylene particles, in which process acetylene is initially polymerized in a suspending agent with the formation of a suspension of polyacetylene particles in "burr" form, the catalyst is deactivated or removed, the solvent is optionally exchanged, and p- or n-doping is then carried out by adding a dopant additive in substance or in solution to the suspension.

3 Claims, 1 Drawing Figure

PARTICULATE DOPED POLYACETYLENE

It is known to produce polyacetylenes by the polymerisation of acetylene using mixed organometallic catalysts (J. Polym.Sci. Vol. 12, pages 11–20). It is also known to dope films of crystalline polyacetylene by a treatment with gaseous electron acceptor dopant additives to improve the electrical conductivity of the films (U.S. Pat. No. 4,222,903).

DESCRIPTION OF DRAWING

The present invention relates to a process for the production of doped polyacetylene in the form of particles of a specific physical structure (small fibrous balls, "burrs") suspended in a liquid medium. The structure of the particles may be seen in FIG. I (enlargement 1:105). Such a structure is an essential feature of the present invention. The starting point for the present invention is a suspension of polyacetylene particles in the form of small fibrous balls or "burrs". This suspension is obtained by introducing gaseous acetylene at temperatures of from $-100°$ to $+80°$ C., with agitation, into a solution of an organometallic mixed catalyst in an organic solvent, until a maximum of 30 g of polyacetylene has formed per liter of solution. The solvent for the catalyst which acts simultaneously as the suspending agent for the polyacetylene particles is usually an aliphatic or aromatic hydrocarbon which may be halogenated, for example benzene, toluene, chlorobenzene, tetralin, methylene chloride or chloroform.

The organometallic mixed catalyst or Ziegler catalyst is a reaction product of, on the one hand, compounds of heavy metals of Groups IVb, Vb, VIb, VIIb and VIII of the Periodic Table (Handbook of Chemistry and Physics, 47th edition (1966), p. B 3—Chem. Rubber Company, Cleveland, Ohio/USA), and, on the other hand, aluminium alkyls or aluminium alkyl halides. Ziegler catalysts are known. For the production of the polyacetylene particles according to the present invention, preferably catalysts are used of from 0.05 to 0.2 mols of vanadium compound corresponding to the following general formula:

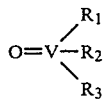

Figure 1:

wherein $R_1$ represents halogen (in particular chlorine); and
$R_2$ and $R_3$ which may be the same or different, each represents halogen (in particular chlorine) or $OR_5$ (wherein $R_5$ represents $C_1$–$C_{20}$ (cyclo)alkyl; and from 0.1 to 20 mols, preferably from 1 to 10 mols, or an alkylaluminium compound of the formulae $Al(R_4)_3$, $AlX(R_4)_2$, $AlX_2(R_4)$, $Al_2X_3(R_4)_3$;

wherein $R_4$ represents $C_1$-$C_{12}$ alkyl, preferably methyl, ethyl, propyl, ispropyl, isobutyl or octyl; and
X represents halogen.

Vanadium compounds which are particularly suitable include the following:

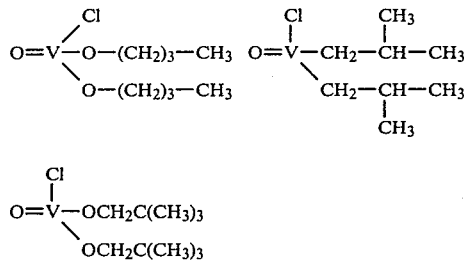

Aluminiun alkyls which are particularly suitable include the following: triethylaluminium, tripropylaluminium, triisopropylaluminium, tributylaluminium, triisobutylaluminium and trioctylaluminium.

Solvents which are particularly suitable include hydrocarbons, such as benzene, toluene, hexane, cyclohexane, tetralin or decalin, and halogenated hydrocarbons, such as methylene chloride, chloroform or chlorobenzene.

The catalysts are prepared in a known manner by reacting the vanadium compound and the aluminium compound in the solvent at temperatures of from $-100°$ to $+30°$ C. Solutions which contain from 5 to 100 mmols of aluminium per liter of solvent are generally used for the subsequent polymerisation process. Acetylene is introduced into this solution in the absence of oxygen and moisture at temperatures of from $-100°$ to $+80°$ C., preferably from $-80°$ to $+20°$ C. A suspension of polyacetylene is produced during this process. Under a microscope, the suspended particles appear as small burrs having a diameter of from 0.01 to 1.0 mm.

The resulting suspensions of polyacetylene particles generally contain from 0.01 to 30 g per liter, preferably from 0.1 to 10 g per liter, or polyacetylene particles. Before treating this suspension further, it may be advantageous to homogenise it mechanically once again, for example, using an "Ultraturrax", and the fibrous structure of the particles should be maintained during this operation.

Before doping, the Ziegler catalyst in these suspensions must initially be deactivated or removed. This may be effected in conventional manner by adding alcohols, such as methanol, ethanol, or mixtures thereof, or by shaking with aqueous acids, for example, hydrochloric acid. However, it is also possible to exchange the suspending agent in which the catalyst is dissolved. This may be effected when it is a matter of removing the catalyst components or if the suspending agent which is present is unsuitable for further processing.

For doping, the dopant additive is added to the suspension as such or in solution. The process may be carried out at temperatures of from $-78°$ to $+100°$ C., preferably from 10° to 30° C. The quantity of dopant additive is generally from $1 \times 10^{-5}$ to $4 \times 10^{-1}$ mols, preferably from $1 \times 10^{-3}$ to $2 \times 10^{-1}$ mols, per gram equivalent of —CH-units (=13 g of polyacetylene).

Excess dopant additive which may remain in the suspension, for example, may be removed by further exchange of the suspending agent or eliminated by suitable measures.

According to the present invention, p-doping and n-doping is possible. Oxidizing agents may be used for p-doping. Examples of such oxidizing agents are as follows: chlorine, bromine, iodine, ICl, IBr, halogen compounds, such as $AsF_5$, $SbF_5$, $SbCl_5$, $AsCl_5$, $PF_5$ and $POF_3$, oxides, such as $NO$, $NO_2$, $H_2O_2$, conc. $H_2SO_4$ and $CrO_3$, or oxygen, ozone or peroxide compounds.

Strong reducing agents are generally used for n-doping. Examples of such reducing agents are as follows: alkali metals or the naphthalides thereof, such as sodium, potassium and sodium naphthalide, or electron donors, such as amines.

Thus, an object of the present invention is to provide a process for the production of a suspension of doped polyacetylene particles wherein acetylene is initially polymerised with organometallic mixed catalysts in a suspending agent with the formation of a suspension of polyacetylene particles in "burr" form, the catalyst is deactivated or removed and p- or n-doping is then carried out by adding a solid or dissolved dopant additive to the suspension.

The present invention also provides a suspension of n- or p-doped polyacetylene particles in "burr" form in an inert suspending agent containing from 0.01 to 30 g of doped polyacetylene per liter of suspension.

The suspensions of doped polyacetylene particles which are obtained according to the present invention may be further processed and used in various ways.

Thus, by removing the suspending agent, for example, by filtration, a cohesive film of doped polyacetylene is produced. The film may be produced in various dimensions and in various thicknesses.

As a result of spraying, a cohesive coating of doped polyacetylene may be obtained which adheres firmly to a wide variety of substrates. The layer thickness may be varied as desired from about 0.1 $\mu$m. By using suitable apparatus, such as a template, various sheet structures may by produced, which are suitable, for example, for printed circuits. Suitable substrates include, for example, glass, paper, plastics, metals, inorganic semiconductors and conductors.

Accordingly, the present invention also provides films or coatings of doped polyacetylene which are obtained by removing the suspending agent from a suspension of burr-shaped doped polyacetylene particles.

It is also possible to dissolve plastics in the suspension. Since a variety of suspending agents may be selected by exchange thereof (polyacetylene is insoluble in all organic solvents), various plastics may also be dissolved. Examples of such plastics are as follows: polycarbonates, cellulose esters, polyamides, styrenehomo- and co-polymers, polyvinyl halides (PVC), polyacrylonitrile, polyesters and polyurethanes. Plastics precursors, for example, epoxy resins may also be dissolved or polyisocyanate/polyol (or polyamine) mixtures may be directly used (polyacetylenes may be suspended in the polyol). The polymer solutions may also contain conventional additives, such as other fillers, stabilizers, flow agents, pigments, plasticizers, wetting agents and antioxidants. By removing the solvent, sheet structures, such as films, coatings, impregnations and fibres may be produced in conventional manner from the plastics solutions containing doped polyacetylene particles, the solutions generally containing from 0.01 to 20%, by weight preferably from 0.1 to 10%, by weight, more particularly from 0.5 to 5%, by weight, of doped polyacetylene and in certain cases, also containing as much as 99%, by weight, based on the plastics. It may be advantageous in some cases to add other conductivity-increasing materials, such as carbon black, graphite, polymeric or low molecular weight organic conductors or metals in the form of powders, fibres or flakes.

Furthermore, it is also possible to isolate the doped polyacetylene particles from the suspensions thereof, without their forming a coherent film. This is achieved, for examaple, by spray- or freeze-drying. A powder of doped polyacetylene is obtained, in which the "burr" structure of the particles is substantially maintained. This powder may be worked into various thermoplasts like a filler by thermoplastic processing methods. For example, the polyacetylene powder may be mixed with a thermoplast in granulate form and the mixture may be extruded for homogeneous distribution. It is also possible to mix the polyacetylene powder and the thermoplast in powder form.

If the plastics powder is insoluble in the suspending agent, it may be suspended in the polyacetylene suspension and filtered together wih the polyacetylene. A homogeneous mixture is then obtained. If the plastics material is soluble, it may be dissolved in the suspension of polyacetylene particles and the suspending agent may then be removed, for example, by spray- or freeze-drying or the polymer may be precipitated using a suitable precipitant and be filtered together with the doped polyacetylene. Powders are obtained which are suitable for thermoplastic processing. These powders may also be used as powder lacquers for the production of coatings. The plastics containing doped polyacetylene have very good mechanical properties. The electrical conductivity may be varied within wide limits. It is particularly suitable to added doped polyacetylene to obtain antistatic properties of plastics.

Practical Examples

EXAMPLE 1

Preparation of the catalyst, polymerisation and processing 1.3 l of toluene are introduced into a 2 liter beaker equipped with a stirring apparatus and 300 ml of toluene are distilled off under a stream of nitrogen. With dry ice cooling, 4 ml (2 mmols) of bis-(2,2,-dimethyl- propoxy)-vanadium oxychloride, 0.5 molar in toluene, and 20 ml (20 mmols) of aluminium triisobutyl, 1 molar in toluene, are added at $-78°$ C. During this addition, the apparatus is constantly under a stream of nitrogen. Pure acetylene is passed through at a rate of 10 l per hour for 1 hour, with stirring. The polyacetylene is precipitated. It is in the form of a pink-violet burr-shaped material (FIG. 1) having a diameter of from 0.05 to 0.5 mm. The thus-obtained suspension contains 4 g of polyacetylene per liter. The reaction is stopped using 0.5 g of 4-methyl-2,6-di-t-butylphenol (ionol), in 400 ml of absolute toluene and the reaction mixture is purged with nitrogen, the temperature rising to 20° C.

EXAMPLE 2

1000 ml of absolute methylene chloride are introduced into a 2 liter beaker equipped with a stirring apparatus. It is cooled to $-78°$ C., and 4.2 ml (12.5 mmols) of titanium tetrabutylate (100%) and 50 ml (50 mmols) of aluminium triisobutyl, 1 molar in methylene chloride, are added.

10 g of acetylene are passed through the catalyst solution at $-78°$ C. over a period of one hour with sitrring and dark polyacetylene is precipitated. The reaction is stopped using a solution of 0.5 g of 4-methyl-2,6-di-t- butyl-phenol (ionol) in 5 ml of methanol and the temperature is allowed to rise to 20° C. under a stream of nitrogen. Under a microscope, the reaction mixture shows dark violet burr-shaped polyacetylene structures having a diameter of about 0.1 mm. The suspension contains 2.5 g of polyacetylene per liter.

EXAMPLE 3

A solution of 4 g of iodine in 100 ml of toluene is added, with stirring, at 20° C., to 1 liter of a polyacetylene suspension prepared according to Example 1 and the mixture is subsequently stirred for 2 hours at room temperature. The originally violet solution fades and a suspension containing doped burr-shaped polyacetylene particles is obtained.

EXAMPLE 4

A suspension which was prepared according to Example 2 was doped using a solution of 2.5 g of iodine in 100 ml of methylene chloride, analogously to Example 3.

EXAMPLE 5

A solution of 5.75 g of atimony pentachloride in 100 ml of methylene chloride is added, with stirring at 20° C., to 1 liter of a polyacetylene suspension prepared according to Example 2 and the mixture is subsequently stirred for 2 hours at 20° C. The doped polyacetylene, which is filtered, shows a specific conductivity of $1.5 \cdot 10^{-1} \Omega^{-1} cm^{-1}$.

EXAMPLE 6

1 liter of cyclohexane is added to 1 liter of a polyacetylene suspension according to Example 4 and the methylene chloride is distilled off, with stirring, under vacuum at about 35° C. The cyclohexane which is also partly distilled off is replenished several times. The end of the solvent exchange may be established by IR spectroscopy.

EXAMPLE 7

Methylene chloride is replaced by butyl acetate analogously to Example 6.

EXAMPLE 8

Methylene chloride is replaced by dimethyl formamide analogously to Example 6.

EXAMPLE 9

Methylene chloride is replaced be tetrahydrofuran analogously to Example 6.

EXAMPLE 10

500 ml of 10% by weight aqueous hydrochloric acid are added to 1 liter of polyacetylene suspension according to Example 2. The mixture is agitated and the aqueous phase which contains the catalyst components is separated. The methylene chloride phase which contains all the polyacetylene is doped using iodine according to Example 4.

EXAMPLE 11

A solution of 2.9 g of sodium naphthalide in 14 g of tetrahydrofuran is added, with stirring, to 1 liter of a polyacetylene suspension according to Example 2, the solvent of which was replaced by tetrahydrofuran according to Example 9. The mixture is subsequently stirred for 2 hours at room temperature. By removing the solvent, a doped polyacetylene having a specific conductivity of $3.10^{-3} \Omega^{-1} cm^{-1}$ may be obtained.

EXAMPLE 12

500 ml of a 10% by weight chromosulphuric acid are added to 1 liter of a polyacetylene suspension according to Example 2 and the mixture is agitated thoroughly. By separating the aqueous phase, a catalyst-free, doped organic polyacetylene suspension is obtained. After removing the solvent, a polyacetlyene film having a specific conductivity of $3.10^{-2} \Omega^{-1} cm^{-1}$ is obtained.

EXAMPLE 13

A suspension prepared according to Example 3 and containing iodine-doped polyacetylene is filtered under suction using a suction filter having a paper filter and is subsequently washed with methylene chloride. A lustrous, iodine-doped polyacetylene film having a specific conductivity of $2.10^{-1} 106^{-1} cm^{-1}$ may be removed from the filter paper. The film diameter and thickness may be exactly adjusted by the size of the suction filter or by the quantity of suspension which is suction filtered.

EXAMPLE 14

A polyacetylene suspension doped using iodine$_2$ according to Example 4 is sprayed onto surfaces of glass, paper, metal, inorganic conductors and semiconductors or plastics. During this procedure, firmly adhering coatings of doped polyacetylene are formed. The coatings may be shaped as desired by a template and the thickness of the coatings may be varied as desired by the quantity sprayed on.

We claim:

1. A process for the production of a suspension suitable for forming films and coatings by spray-drying of doped polyacetylene particles, said process comprising introducing acetylene into an organic solvent which is a hydrocarbon or halogenated hydrocarbon and contains, as a Ziegler catalyst, a catalytic amount of a reaction product of (1) a metal compound of Groups IVb, Vb, VIb, VIIb, or VIII of the Periodic Table and (2) an aluminium alkyl or aluminum alkyl halide to thereby form shaped polyacetylene particles suspended in the organic solvent, deactivating the Ziegler catalyst, and p- or n-doping the polyacetylene particles by adding a dopant additive.

2. A suspension of n- or p-doped polyacetylene particles in burr-form, obtainable by the process of Claim 1, having particle diameters of from 0.01 to 1 mm and containing from 0.01 to 30 grams of doped polyacetylene per liter of suspension.

3. Films of doped polyacetylene obtainable by the process of claim 1, said films being made by removing the organic solvent from the suspension.

* * * * *